US 6,542,341 B1

United States Patent
Carey et al.

(10) Patent No.: US 6,542,341 B1
(45) Date of Patent: Apr. 1, 2003

(54) MAGNETIC SENSORS HAVING AN ANTIFERROMAGNETIC LAYER EXCHANGE-COUPLED TO A FREE LAYER

(75) Inventors: Matthew Joseph Carey, San Jose, CA (US); Jeffrey Robinson Childress, San Jose, CA (US); Bruce Alvin Gurney, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,039

(22) Filed: Nov. 18, 1999

(51) Int. Cl.⁷ .............................................. G11B 5/127
(52) U.S. Cl. ..................................................... 360/324
(58) Field of Search .............................. 360/324, 324.1, 360/324.11, 324.12, 126

(56) References Cited

U.S. PATENT DOCUMENTS

| | | | |
|---|---|---|---|
| 5,159,513 A | 10/1992 | Dieny et al. | 360/324.12 |
| 5,206,590 A | 4/1993 | Dieny et al. | 324/252 |
| 5,528,440 A * | 6/1996 | Fontana et al. | 360/324.12 |
| 5,729,410 A | 3/1998 | Fontana, Jr. et al. | 360/324.12 |
| 5,966,012 A * | 10/1999 | Parkin | 324/252 |
| 5,966,272 A * | 10/1999 | Cain | 360/327.22 |
| 6,175,477 B1 * | 1/2001 | Lin et al. | 360/324.12 |
| 6,178,072 B1 * | 1/2001 | Gill | 360/324.11 |
| 6,185,078 B1 * | 2/2001 | Lin et al. | 360/324.1 |

\* cited by examiner

*Primary Examiner*—Allen Cao
(74) *Attorney, Agent, or Firm*—Lumen Intellectual Property Services, Inc.

(57) ABSTRACT

A magnetic sensor which detects an external magnetic field with the aid of a ferromagnetic free layer having a magnetic moment responsive to the external magnetic field. The magnetic sensor has an antiferromagnetic layer which is magnetically exchange-coupled to the free layer to produce an exchange bias field $H_e$ which acts on the free layer to bias its magnetic moment along a certain orientation such as the transverse direction. The additional exchange bias field $H_e$ is used in balancing a total transverse internal magnetic field $H_t$ which is due to other fields generated by the sensor itself. The value of exchange bias field $H_e$ is set, e.g., by selecting a certain thickness and a certain composition of the antiferromagnetic layer. The magnetic sensor of the invention can also have a non-magnetic spacer layer interposed between the free layer and the antiferromagnetic layer or be in contact with the free layer. The sensor can be a spin valve sensor, a tunnel valve sensor, or any magnetic sensor using the free layer and the magnetoresistive effect to detect the external magnetic field.

22 Claims, 12 Drawing Sheets

MAGNETIC SENSORS HAVING AN ANTIFERROMAGNETIC LAYER EXCHANGE-COUPLED TO A FREE LAYER

FIELD OF THE INVENTION

This invention relates generally to magnetic sensors for detecting external magnetic fields using a ferromagnetic free layer, and in particular to magnetic sensors such as spin valves or tunnel valves in which the free layer is exchanged coupled with an antiferromagnetic layer.

BACKGROUND OF THE INVENTION

Thin film magnetoresistive heads have been used in magnetic data storage devices for several years. The fundamental principles of magnetoresistance including anisotropic magnetoresistance (AMR), giant magnetoresistance (GMR) and spin tunneling have been well-known in the art for some time. Magnetic read heads, e.g., those used in the field of magnetic recording, use magnetic sensors built on these principles and other effects to produce devices capable of reading high density magnetically recorded data. In particular, three general types of magnetic read heads or magnetic readback sensors have been developed: the anisotropic magnetoresistive (AMR) sensor, the giant magnetoresistive (GMR) sensor or GMR spin valve and tunnel valve sensor. The construction of these sensors is discussed in the literature, e.g., in U.S. Pat. No. 5,159,513 or U.S. Pat. No. 5,206,590.

Magnetoresistive sensors rely on a ferromagnetic free layer to detect an external magnetic field, e.g., the field produced by data stored in the form of magnetic domains in a magnetic storage medium. The free layer typically has a low coercivity and low anisotropy and thus an easily movable or rotatable magnetic moment which responds to the external field. The rotation of the free layer's magnetic moment causes a change in the resistance of the device by a certain value ΔR (measured between electrical contacts). (In general, the larger the value of ΔR in relationship to total resistance R, i.e., the larger ΔR/R the better the sensor.) This change in resistance due to rotation of the magnetization of the free layer can thus be electronically sensed and used in practical applications such as reading of magnetic data.

An important concern in the design of the sensor is the longitudinal bias of the free layer. In particular, the free layer must be biased by a hard bias so that it is essentially in a single domain state. Deviations from a single domain state are mostly due to edge effects and corners and demagnetizing field effects as the sensor is excited by the external magnetic field. Also, the free layer has to be properly biased in the quiescent state to ensure a linear or essentially linear response with maximum dynamic range. When the free layer is allowed to have more than one magnetic domain, then the free layer experiences Barkhausen jumps and other domain reorientation phenomena, as is known in the art. This is highly undesirable as it produces noise and worsens the signal-to-noise ratio (SNR) of the sensor.

In order to provide the biasing field and prevent noise some of the prior art sensors deploy a longitudinal biasing scheme or a hard bias layer having a high coercivity. Typically, such scheme uses a magnetic material placed essentially in the same plane as the free layer next to and close to it. For example, a hard bias material such as CoPt hard magnet alloy can be used in the form of a hard bias tab. This biasing scheme ensures that the free layer has a single magnetic domain. For more details on longitudinal biasing the reader is referred to U.S. Pat. No. 5,729,410 to Fontana, Jr. et al.

To properly bias the free layer other prior art solutions employed in spin valve and tunnel valve sensors balance the forces of the magnetostatic field $H_m$ set up by the pinned layer, the interlayer coupling field $H_i$ between the free layer and the pinned layer (due to Neél orange peel, pinholes, oscillatory coupling etc.) and the current-induced field $H_j$ caused by current flowing through the sensor structure. This approach is illustrated in FIG. 1 in a typical spin valve 12 with a seed layer 14 on one side and a cap layer 24 on the other side. Sandwiched between layers 14, 24 are a ferromagnetic free layer 16, a spacer layer 18, and a pinned layer 20 which is exchange-coupled with an antiferromagnetic layer 22. The arrows indicate the overall magnetizations of layers 16, 20 and 22. A current j flowing through spin valve 12 between electrical contacts (not shown) is indicated by an arrow. For optimal performance free layer 16 has to be properly magnetically biased so that its response to an external magnetic field, e.g., a field created by a magnetic recording medium, is highly linear and so that there is maximum dynamic range (i.e., so that the responses to a positive and negative signals are both as large as possible before there is signal saturation). This is accomplished by maintaining the magnetization of free layer 16 substantially at 90° to the magnetization of pinned layer 20 in the absence of a signal or external magnetic field. Thus, the forces of fields $H_m$, $H_i$ and $H_j$ as well as any other forces (e.g., due to uniaxial anisotropy, shape anisotropy, etc.) acting on free layer 16 have to be balanced such that the transverse component of the sum of the forces acting on the free layer cancel:

$$H_i + H_j + H_m = 0 \qquad \text{(Eq. 1)}$$

Thus the transverse components of these vectors add to zero. In practice, these vectors are aligned along a transverse direction as shown and that is why vector addition can be replaced by simple addition. Under ideal conditions equation 1 is satisfied over entire free layer 16 such that free layer 16 experiences zero field and is highly sensitive to the external magnetic field.

The problem with balancing the transverse components of $H_i$, $H_j$ and $H_m$ is that in a practical device such balance is hard to achieve. Generally, magnetostatic field $H_m$ is spatially non-uniform in free layer 16 with substantial fields of 100–200 Oe present at a bottom surface 26 (typically the air-bearing surface) and at a top surface 28, and substantially lower fields in the interior of free layer 16. The result is a spatially non-uniform orientation of the magnetization in free layer 16. Field $H_i$ is uniform across sensor 12 but is not easily controlled over a wide range and can not be always made small. Also, $H_i$ and $H_m$ depend on a height of free layer 16 or the stripe height between bottom surface 26 and top surface 28. This height can not be easily controlled in practice. Field $H_j$ is nearly uniform except for variations caused by current bunching near the leads.

Thus, equation 1 is typically constraining since the values of $H_m$, $H_i$, and $H_j$ cannot be independently optimized, especially if large magnetoresistance is to be obtained because the optimization of magnetoresistance often requires layer thicknesses incompatible with the constraint of equation 1. The result is a non-optimal compromise.

In particular, it would be desirable to make $H_m$ as small as possible so that the $H_m$-related nonuniformities are minimized. It would also be desirable to make $H_j$ relatively large to be able to use a large bias current for increased sensitivity. To satisfy the equation, then, $H_i$ must be made relatively large to help balance $H_j$. This poses problems because $H_i$ is sensitively dependent upon the surface textures of the layers.

It is difficult to fabricate the layers so that a large, well-defined value of $H_i$ is provided consistently. Therefore, there exists a practical limit on the magnitude of $H_i$.

Consequently, $H_m$ and $H_j$ cannot have vastly different magnitudes. At best, state of the art GMR sensors compromise between the competing benefits of low $H_m$ values, high $H_j$ values and low $H_i$ values.

There thus exists a need for developing a proper scheme for longitudinal biasing of the free layer of a magnetic sensor. In particular, there exists a need for balancing fields $H_m$, $H_i$ and $H_j$ acting on the free layer without sacrificing the ability to optimize the values of these fields for good sensor performance. More precisely, there exists a need for magnetic sensors such as spin valve or tunnel valve sensors that have very low $H_m$ and controlled $H_i$, yet allow high values of $H_j$ while keeping the free layer properly biased.

OBJECTS AND ADVANTAGES OF THE INVENTION

Accordingly, it is a primary object of the present invention to provide a structure for longitudinal biasing of a free layer in a magnetic sensor, such as a spin valve or a tunnel valve. The improved bias is provided while allowing for low values of magnetostatic field $H_m$, low values of interlayer coupling field $H_i$ and high values of field $H_j$ due to current flow through the sensor.

It is another object of the invention to ensure that the bias of the free layer is more spatially uniform and that the sensitivity of the biasing has a reduced sensitivity to stripe height variation.

Yet another object of the invention is to provide a transverse bias to the free layer while maintaining reduced free layer stiffness.

These and other objects and advantages will be apparent upon reading the following description and reviewing the accompanying drawings.

SUMMARY OF THE INVENTION

These objects and advantages are attained by a magnetic sensor which detects an external magnetic field with the aid of a ferromagnetic free layer having a magnetic moment responsive to the external magnetic field. The magnetic sensor has a first antiferromagnetic layer which is magnetically exchange-coupled to the free layer to produce an exchange bias field $H_e$. This exchange bias field $H_e$ acts on the free layer to bias its magnetic moment along a certain orientation. In this manner, the invention provides an additional field, the exchange bias field $H_e$, which gives the designer an additional degree of freedom in balancing a total transverse internal magnetic field $H_t$ which is due to other fields generated by the sensor itself. For example, in a sensor such as a spin valve fields $H_m$, $H_i$, $H_j$ and potentially other fields act on the free layer to produce total transverse internal magnetic field $H_t$ which requires balancing.

The value of exchange bias field $H_e$ is set by selecting a certain thickness and a certain composition of the antiferromagnetic layer. The magnetic sensor of the invention can also have a first non-magnetic spacer layer interposed between the free layer and the first antiferromagnetic layer. Such spacer layer can have a thickness in the range of 0.1 to 3.0 nanometers. Alternatively, the first antiferromagnetic layer can be in contact with the free layer.

The sensor can be a spin valve sensor or a tunnel valve sensor. In general, this principle can be applied in any magnetic sensor using the free layer and the magnetoresistive effect to detect the external magnetic field.

The sensor of the invention can be used in a magnetic read head, e.g., a magnetic read head for reading data recorded in a magnetic recording medium in the longitudinal recording mode. In this application the orientation in which the free layer's magnetic moment is biased should be longitudinal. Of course, the sensor can also be used in other magnetic recording schemes.

There are numerous types of sensors in which the antiferromagnetic layer exchange-coupled to the free layer can be used. Preferably, these sensors use a pinned layer having a magnetic moment further fixed or stabilized by an antiferromagnetic layer. In other words, these sensors use an anti-parallel pinned layer. A magnetostatic field $H_m$ produced by the anti-parallel pinned layer is advantageously small and can be made near zero so that it is easy to balance.

The first antiferromagnetic layer which is exchange-coupled to the free layer can be made of various materials. Preferably, materials containing Mn are used. Suitable alloys containing Mn include FeMn, PtMn, IrMn, PdPtMn and NiMn. Preferably, the first antiferromagnetic layer has a thickness between 20 and 400 Å.

A preferred structure of a magnetic sensor for use in magnetic read heads uses an anti-parallel (AP) pinned trilayer with a second antiferromagnetic layer for anti-parallel pinning the AP pinned trilayer. The entire sensor is thus constructed of the following layers: a second antiferromagnetic layer; an AP pinned trilayer including a first ferromagnetic layer comprising Co, an AP spacer layer comprising Ru, and a second ferromagnetic layer comprising Co; a second non-magnetic spacer layer comprising Cu; a nanolayer comprising Co; a ferromagnetic free layer comprising NiFe; and a first antiferromagnetic layer exchange-coupled to the ferromagnetic free layer.

The details of the invention and its embodiments are described in the detailed description and refer to the attached drawing figures.

DETAILED DESCRIPTION

Figure 2:
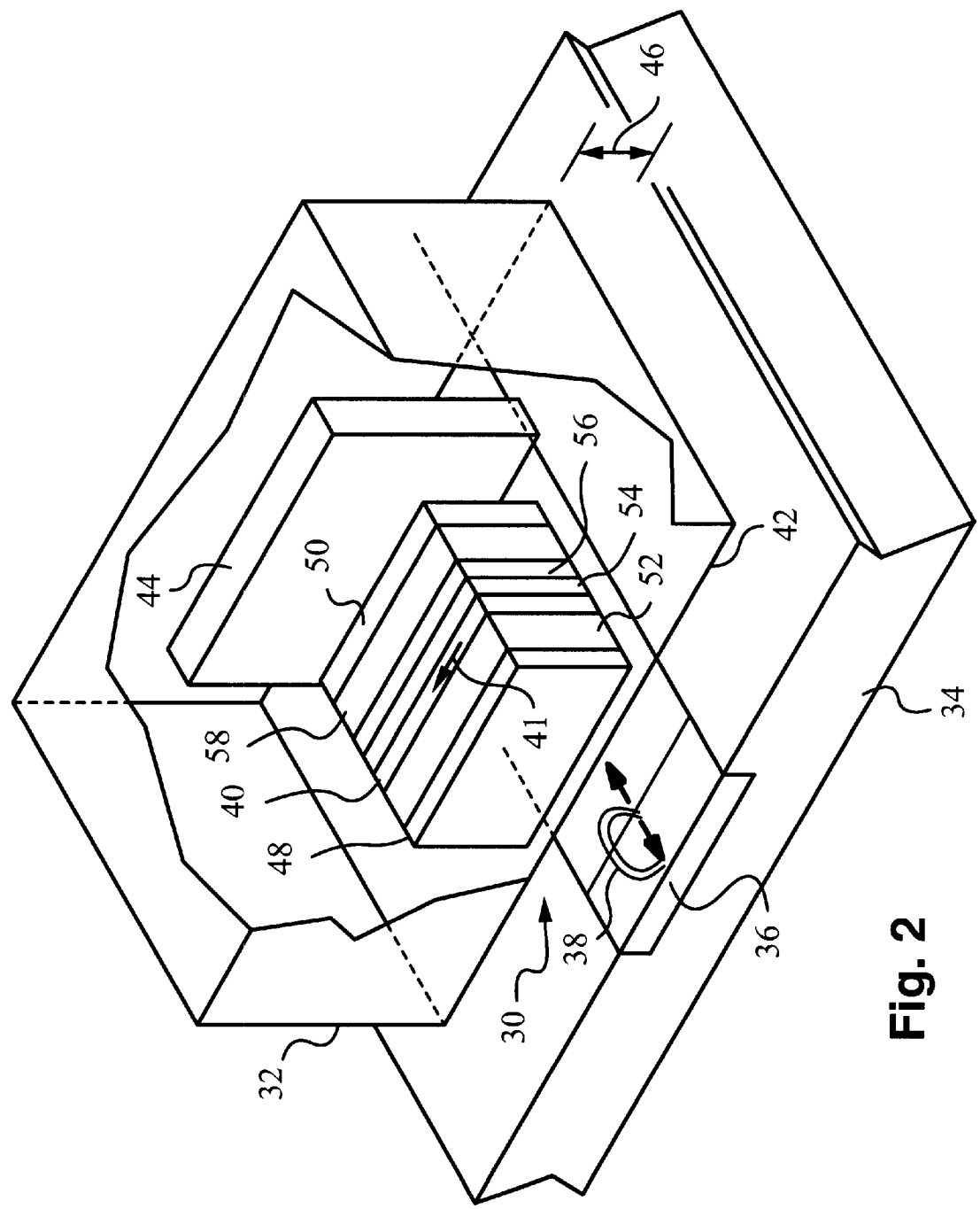
FIG. 2 is an isometric cut-open view of a portion of a device using a spin valve sensor as a magnetic read head in accordance with the invention.

FIG. 2 shows a magnetic sensor 30, in this case a spin valve according to the invention mounted in a device 32 for scanning over a magnetic recording medium 34. Data written in medium 34 in the form of magnetic domains 36 (magnetization indicated by arrows) is the source of external magnetic fields 38 (indicated by field lines). Spin valve 30 is oriented to register or read external magnetic fields 38 with the aid of a sensor layer or a ferromagnetic free layer 40. During the reading process a magnetic moment 41 of free layer 40 is responsive to external magnetic field 38. In fact, magnetic moment 41 is rotated or flipped by external field 38 to either point substantially up or down.

In this embodiment device 32 is an air bearing slider whose air bearing surface 42 faces medium 34. During operation slider 32 flies over medium 34 at a flying height 46 and allows spin valve 30 to scan over magnetic data 36 in medium 34. Magnetic moment 41 of free layer 40 is oriented parallel to air bearing surface 42 in the absence of external magnetic field 38 from medium 34. Slider 32 has a shield 44 separating spin valve 30 from other components, e.g., a magnetic write head (not shown), which may be mounted in slider 32 for recording magnetic data 36 in medium 34. It is understood that there are many other configurations in which spin valve 30 can be employed for reading magnetic data from medium 34, including contact sliders and other types of scanning mechanisms.

Figure 1:
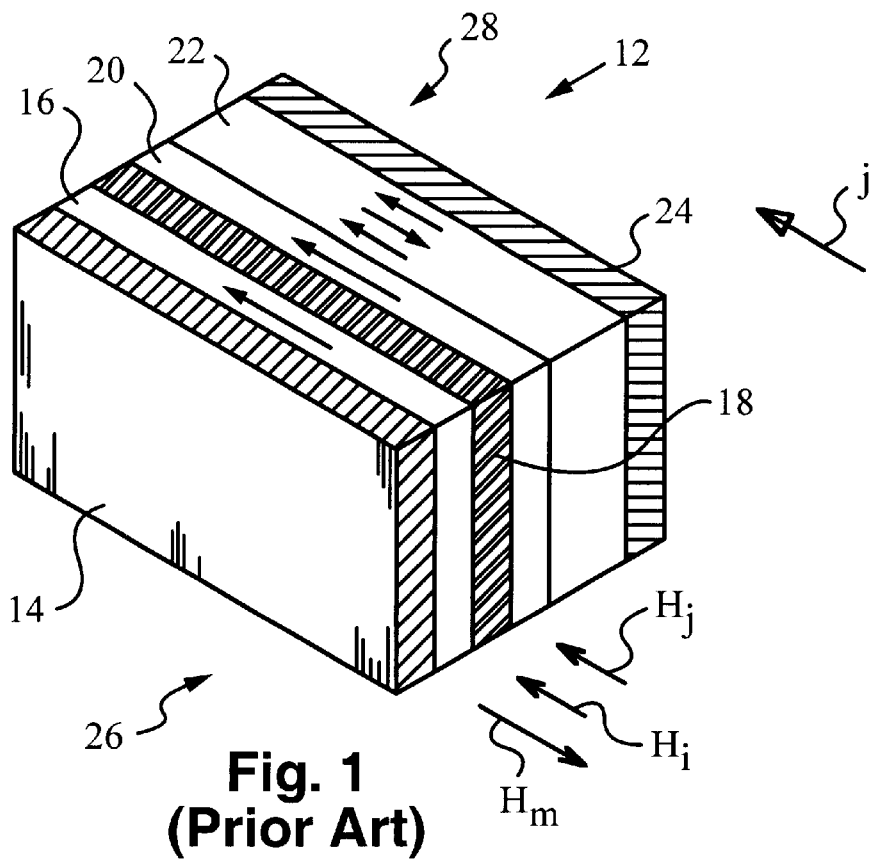
FIG. 1 (Prior Art) shows a typical spin valve.
Figure 3:
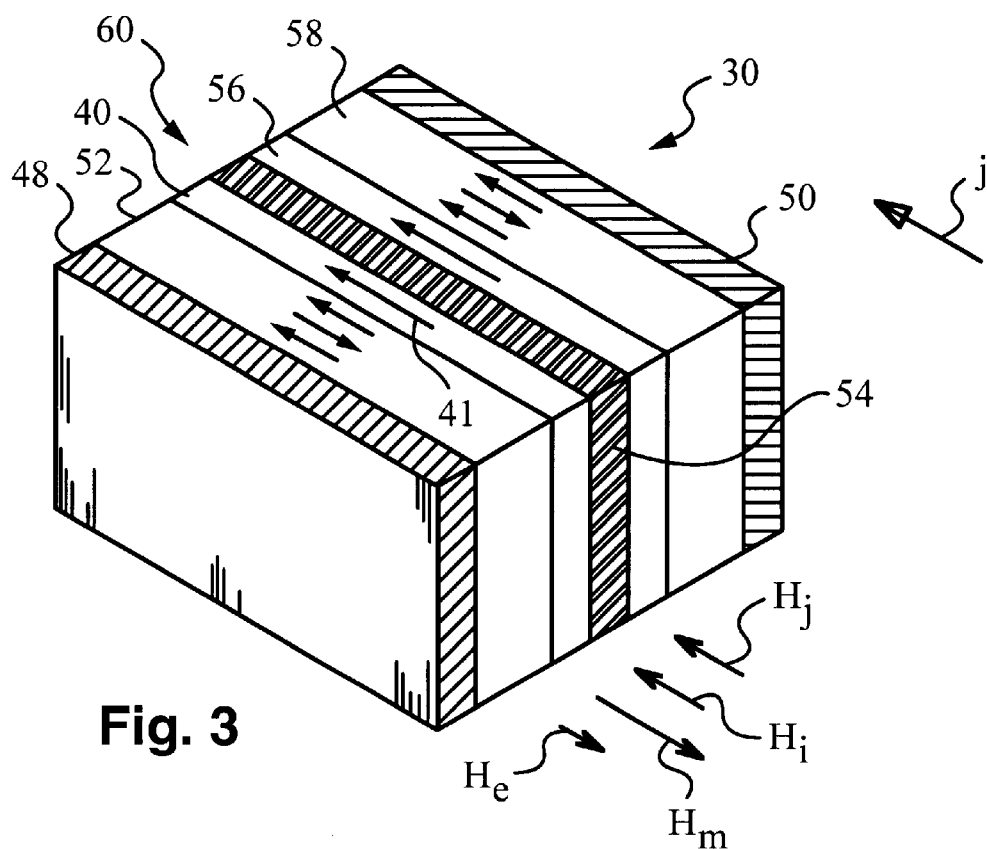
FIG. 3 is a detailed view of the spin valve sensor of FIG. 2.

Spin valve 30 is built of thin film layers, which are more clearly seen in FIG. 3. A seed layer 48 and a cap layer 50 sandwich the internal layers of spin valve 30. The internal layers include a first antiferromagnetic (AF) layer 52, preferably made of a weak antiferromagnetic material, deposited next to free layer 40. In this embodiment AF layer 52 is in contact with free layer 40 and is set to magnetically exchange-couple with free layer 40 in accordance to well-known physical principles of antiferromagnetic exchange-coupling. The exchange-coupling between AF layer 52 and free layer 40 produces an exchange bias field $H_e$ indicated by a vector. Exchange bias field $H_e$ produces a force which influences magnetic moment 41 of free layer 40.

A second non-magnetic spacer layer 54 and a pinned layer 56 are deposited on the other side of free layer 40. Spacer layer 54 is typically a conducting metal, e.g., Cu, which is highly conductive to a current j which passes through sensor 30 during operation. Pinned layer 56 has a magnetization or magnetic moment which is fixed and aligned at substantially 90° to magnetic moment 41 of free layer 40. This is done to improve the linearity of response of the output signal to external field 38, as is known in the art. A second antiferromagnetic layer 58 is deposited next to pinned layer 56 in order to achieve anti-parallel pinning of layer 56. This manner of pinning layer 56 is also well-known in the art.

In the absence of external magnetic fields 38, the forces acting on free layer 40 arise from magnetic fields generated by sensor 30 itself. Thus, a magnetostatic field $H_m$ is set up by pinned layer 56, an interlayer coupling field $H_i$ is produced from Néel orange peel, pinholes, oscillatory coupling and other effects between free layer 40 and pinned layer 56, and a current induced field $H_j$ is produced by current j flowing through sensor 30 during operation. In particular, magnetostatic field $H_m$ arising from pinned layer 56 is always opposite to the magnetic moment of pinned layer 56 and is very non-uniform; generally stronger near the edges of free layer 40. These non-uniformities of field $H_m$ additionally cause non-uniformities in the orientation of magnetization 41 of free layer 40. Hence, reducing field $H_m$ to a low value reduces field non-uniformities and makes uniform biasing of free layer 40 easier. Most preferably, field $H_m$ should be nearly zero for best results. Interlayer coupling field $H_i$ is strongly influenced by the microscopic surface roughness of free layer 40 and pinned layer 56. In practice surface roughness can not be easily controlled and thus keeping field $H_i$ arbitrarily high is difficult. $H_i$ is typically kept low so that it can be controlled. Field $H_j$ due to current j flowing through sensor 30, and in particular through free layer 40, spacer layer 54 and pinned layer 56, is preferably large. That is because current j should be significant to thus keep the signal from sensor 30 large.

Together, fields $H_m$, $H_i$ and $H_j$ produce a total field $H_t$. As discussed above, fields $H_m$, $H_i$ and $H_j$ should be balanced to obtain optimal bias of free layer 40. The prior art difficulties in obtaining this balance are overcome by the addition of exchange bias field $H_e$, which also acts on free layer 40. Thus, in accordance to the invention, proper biasing of free layer 40 requires that the transverse components of the field vectors of the above fields are nearly or completely canceled out as follows:

$$H_t + H_e = H_i + H_j + H_m + H_e = 0. \qquad \text{(Eq. 2)}$$

In this equation the transverse components of the fields are indicated, e.g., $H_t$ represents the total transverse internal magnetic field. In practice, any longitudinal components of the field vectors should also be small in order to minimize the magnetic stiffness of free layer 40. It may, however, be non-zero in order to provide some longitudinal bias. Additional forces, specifically transverse ones due to uniaxial anisotropy, shape anisotropy, etc. can also be present and they can be included in total field $H_t$ as necessary.

The additional exchange bias field $H_e$ enables one to achieve good biasing of magnetic moment 41 of free layer 40 along the transverse direction or parallel to air bearing surface 42, while allowing for low or nearly zero values of magnetostatic field $H_m$, low values of interlayer coupling field $H_i$ and high values of field $H_j$. Referring back to FIG. 3, it can be seen that the vectors representing the transverse components of fields $H_m$, $H_i$, $H_j$ and $H_e$ add up to zero as required by equation 2. Of course, a person skilled in the art will realize that the actual vector magnitudes and directions will vary depending on the type of magnetic sensor, direction of flow of current j and other parameters. Hence, for each sensor to be balanced the field vectors should first be determined to calculate the proper magnitude and direction of the $H_e$ field vector.

An important freedom provided by exchange bias field $H_e$ is that it allows one to reduce the magnitude of field $H_m$ to nearly zero while maintaining correct bias when fields $H_i$ and $H_j$ cannot be made to cancel. This situation arises, for example, when spacer layer 54 between free layer 40 and pinned layer 56 cannot be deposited reliably with $H_i$ large enough to cancel $H_j$, which must remain high in order to obtain a sufficiently large signal. Field $H_m$ can be reduced by using a thin pinned layer 56, a pinned layer material with lower magnetization or by using an anti-parallel pinned layer as shown in FIG. 3. An additional benefit is that the dominant forces now acting on free layer 40 are $H_i$, $H_j$ and $H_e$, all of which are uniform across the stripe height or from air bearing surface 42 up to a top surface 60 of free layer 40. As a result, magnetization or magnetic moment 41 of free layer 40 will also be uniform across the stripe height and thus increase and improve the signal produced by sensor 30. A further benefit is that domain noise due to the tendency for the formation of closure domains in free layer 40 is also reduced in this biasing scheme. Furthermore, it is also possible to orient exchange bias field $H_e$ at an angle with respect to the transverse direction and provide longitudinal bias for domain stabilization.

AF layer 52 also enables one to reduce or eliminate the sensitivity of the bias point of free layer 40 to stripe height variations by permitting spin valves with antiparallel pinned layers and other pinned layers of low moment to be properly biased in an easy manner. In general, such stripe height variations are encountered in manufacturing of sensor 30 due to tolerances in deposition and lapping steps. To provide flexibility to reduce or eliminate the sensitivity of the bias point to stripe height variations using a low moment pinned layer AF layer 52 can be chosen to provide a weak exchange-coupling field between AF layer 52 and free layer 40; i.e., AF layer 52 is a weak antiferromagnet.

Figure 4:
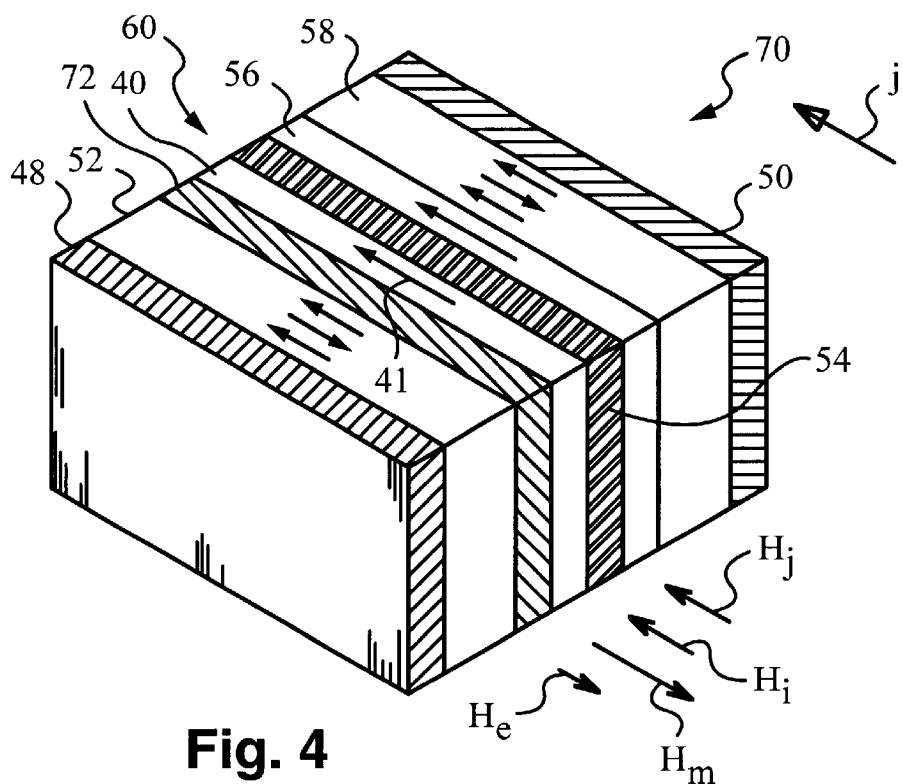
FIG. 4 shows a spin valve with a spacer layer between the antiferromagnetic layer and the free layer in accordance with the invention.

In an alternative embodiment of a spin valve 70 shown in FIG. 4, an additional non-magnetic spacer layer 72 is provided between AF layer 52 and free layer 40 to reduce or eliminated the sensitivity of the bias point to stripe height variations. The same reference numerals are used to refer to the same elements as in FIGS. 2 and 3. In this case AF layer 52 is a strong antiferromagnet. Non-magnetic spacer layer 72 reduces the strength of exchange-coupling between AF layer 52 and free layer 40. Layer 72 is preferably a conductive material, e.g., Cu, to further improve the flow of current j through sensor 30. However, it is not necessary for spacer layer 72 to be conductive. In addition, when AF layer 52 is also conductive, then current j will flow through AF layer 52 as well and contribute to field $H_j$. However, because current j flowing through layer 72 and AF layer 52 is on the other side of free layer 40 from pinned layer 56 and spacer layer 54, it contributes to field $H_j$ with the opposite sign. In other words, the vectors representing the contribution of layer 72 and AF layer 52 to vector $H_j$ are at 180° to the vectors representing the contribution of layers 54, 56. Thus, the magnitude of field $H_j$ acting on free layer 40 will be reduced. This can be taken into account in the equation which yields the magnitude of field $H_j$:

$$H_j = N \frac{2\pi j}{h} \quad \text{(Eq. 3)}$$

where j is the current and h is the stripe height, by correspondingly reducing the value of factor N from its typical value of about 0.5 to a lower value. In this equation j is stated in mA and h is in microns.

In fact, by allowing the portions of current j flowing on either side of free layer 40 to be equal, i.e., the portion of current j flowing on the side of pinned layer 56 is equal to the portion of current j flowing on the side of AF layer 52, the value of N can be reduced to zero. In this situation there will be no bias point dependence on current j since field $H_j$ acting on free layer 40 will be zero. Therefore, variations in stripe height will not alter the bias point in fixed voltage or fixed current operation. However, the addition of spacer layer 72 results in a reduction in magnetoresistance and thus decreases the sensitivity of sensor 70. If the magnetoresistive effect of sensor 70 is sufficiently large, then the decrease is offset by the advantage of not having a bias point dependence of free layer 40 on current j.

Figure 5:
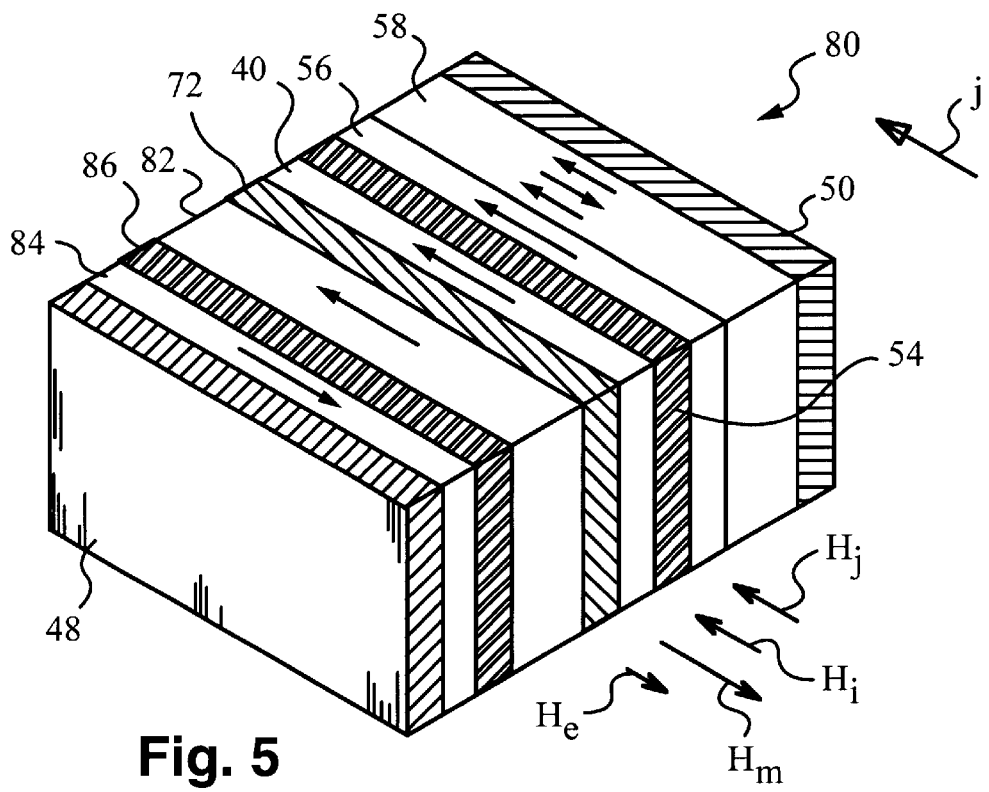
FIG. 5 shows a spin valve with an anti-parallel pinned structure according to the invention.

FIG. 5 shows yet another embodiment of the invention implemented in a spin valve 80. The same parts as in FIG. 4 are labeled with the same reference numbers. In this case an anti-parallel pinned layer 82 provides exchange bias field $H_e$ to free layer 40. Layer 82 is anti-parallel pinned with the aid of a ferromagnetic layer 84, from which it is separated by a spacer layer 86. This type of anti-parallel pinning is well-known in the art.

In addition to the above-mentioned advantages, spin valves of the invention, when $H_e$ is oriented at an angle with respect to the transverse direction, can provide a longitudinal bias to the free layer. This means that the free layer has both a higher sensitivity and is single domain (thus eliminating the problem leading to Barkhausen noise).

Figure 6:
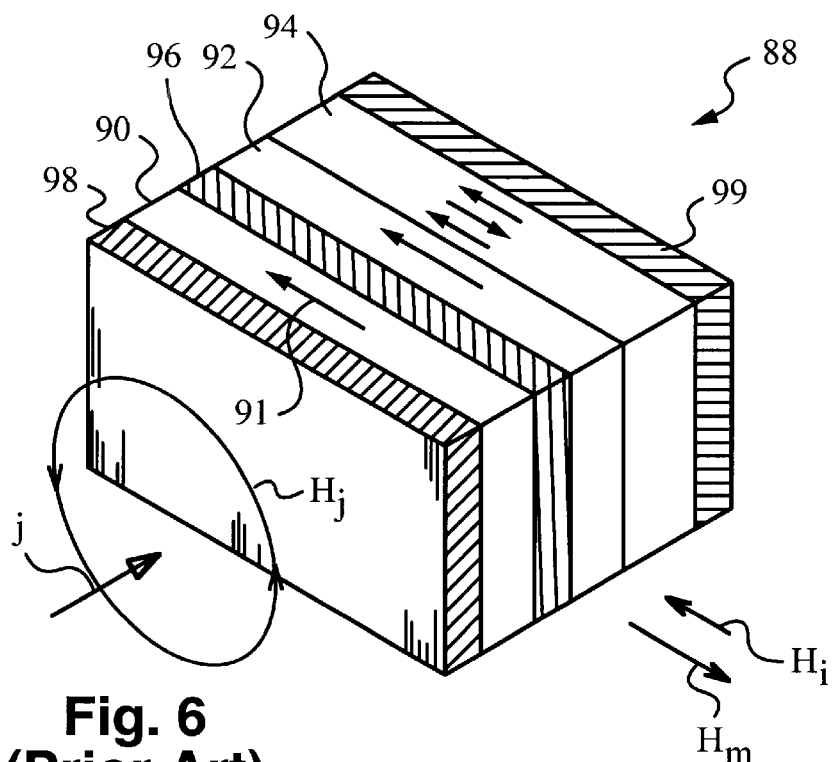
FIG. 6 (Prior Art) shows a typical tunnel valve sensor.

In accordance with the invention, AF layers exchange-coupled to the free layer for providing exchange bias field $H_e$ are preferably employed in spin valves. However, the invention can also be applied to tunnel valve sensors. FIG. 6 shows a prior art tunnel valve sensor 88 with a free layer 90 and a pinned layer 92 having a magnetization or magnetic moment which is fixed and aligned at substantially 90° to a magnetic moment 91 of free layer 90 when no external magnetic field is present. As in a spin valve, this is done to improve the linearity of response of magnetic moment 91 to external fields. An antiferromagnetic layer 94 is deposited next to pinned layer 92 in order to achieve anti-parallel pinning of layer 92. Again, this manner of pinning layer 92 is well-known in the art.

During operation, tunnel valve 88 conducts current j by allowing charge carriers to tunnel through barrier layer 96 in accordance with well-known physical principles. Thus, current j in tunnel valve 88 flows in a direction perpendicular to the direction of current flow in conventional spin valves. Field $H_j$ acting on free layer 90 is thus circumferential, as shown. One of the problems with prior art tunnel valve 88 is that tunnel barrier layer 96 is much thinner than corresponding spacer layer (i.e., spacer layer 54) in spin valves. Therefore, interlayer coupling between free layer 90 and pinned layer 92 is typically stronger and interlayer coupling field $H_i$ may reach a magnitude of 50 Oe or more, which is unacceptable in a sensitive device.

Figure 7:
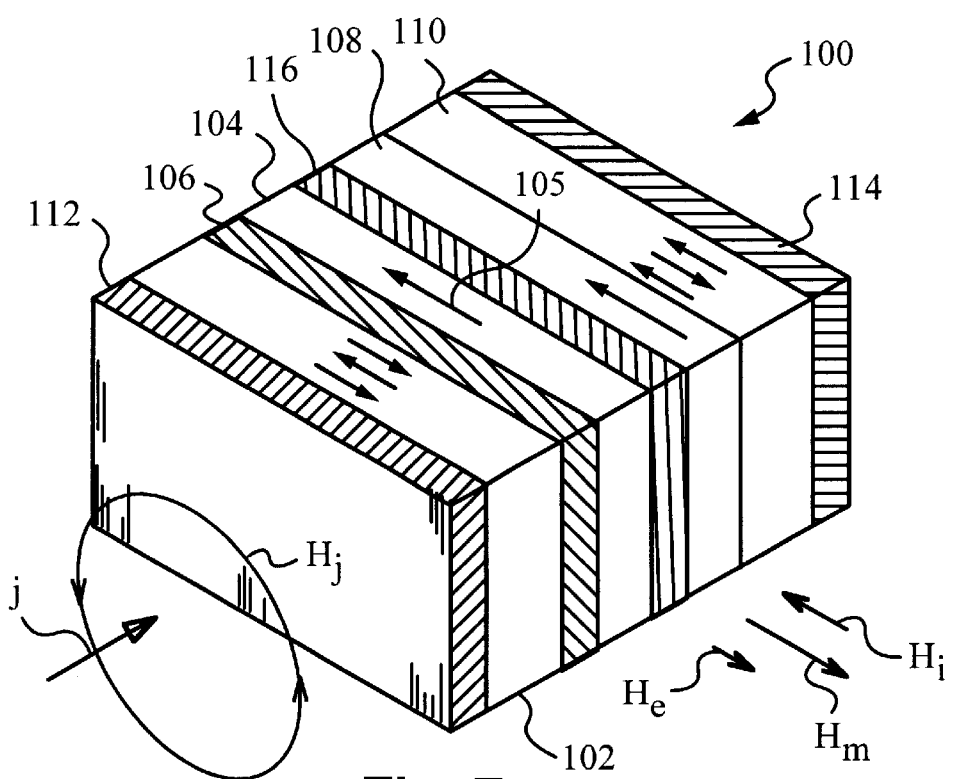
FIG. 7 shows a tunnel valve sensor according to the invention.

FIG. 7 shows a tunnel valve 100 which reduces or eliminates the large $H_i$ field. Tunnel valve 100 has a free layer 104 which is exchange-coupled with a first AF layer 102 across a conducting spacer 106. On the other side of free layer 104 is a pinned layer 108 and a second AF pinning layer 110 for pinning layer 108. Pinned layer 108 has a magnetization or magnetic moment which is fixed and aligned at substantially 90° to a magnetic moment 105 of free layer 104 when no external field is present to improve the linearity of response of magnetic moment 105 to external fields. A tunnel barrier layer 116 made of a suitable electric insulator is interposed between free layer 104 and pinned layer 108. All the above-described layers of tunnel valve 100 are sandwiched between a seed layer 112 and a cap layer 114.

In this embodiment the direction exchange bias $H_e$ field is set opposite to the direction of $H_i$ field. In other words, exchange bias field $H_e$ is used for reducing or eliminating the large $H_i$ field produced in tunnel valve 100. This is most efficiently done by anti-parallel pinning of layer 102 (e.g., in the manner layer 82 is anti-parallel pinned in FIG. 5). Of course, as in the spin valve embodiments, proper balancing of all internally generated magnetic fields is obtained when their sum is made substantially zero by balancing free layer 104 to orient on the average along the longitudinal direction.

EXAMPLES

Figure 8:
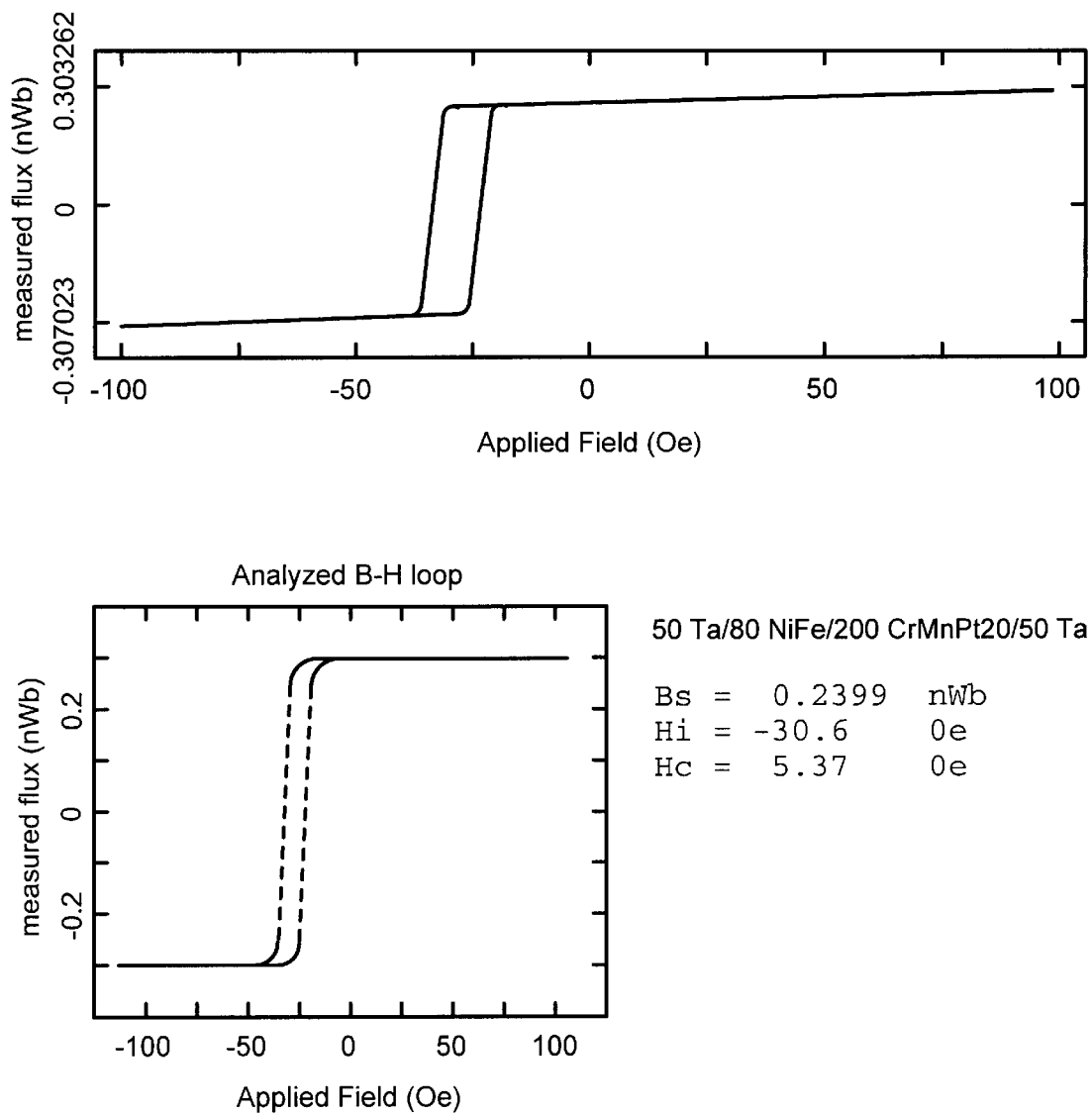
FIG. 8 graphs illustrating exchange anisotropy for a CrMnPt (800 Å)/NiFe(80 Å) bilayer structure.

Spin valve sensors and tunnel valve sensors according to the invention can use a wide variety of materials in the AF layer exchange-coupled with the free layer. A person skilled in the art will appreciate that the following cases serve for illustrative purposes only. For example, alloys containing Mn such as FeMn, PtMn, IrMn, PdPtMn and NiMn as well as their alloys with V, Pd, Pt, Cr, Ru, Rh and Os can be used. The value of exchange bias field $H_e$ is set by selecting a certain thickness and a certain composition of the antiferromagnetic layer. The graph in FIG. 8 illustrates the results for a CrMnPt AF layer which has an exchange anisotropy of 30.6 Oe, i.e., it can produce an exchange bias field He=30.6 Oe. In particular, this graph is for an 800 Å thick CrMnPt layer exchange coupled to an 80 Å NiFe layer representative of a typical free layer.

Figure 9:
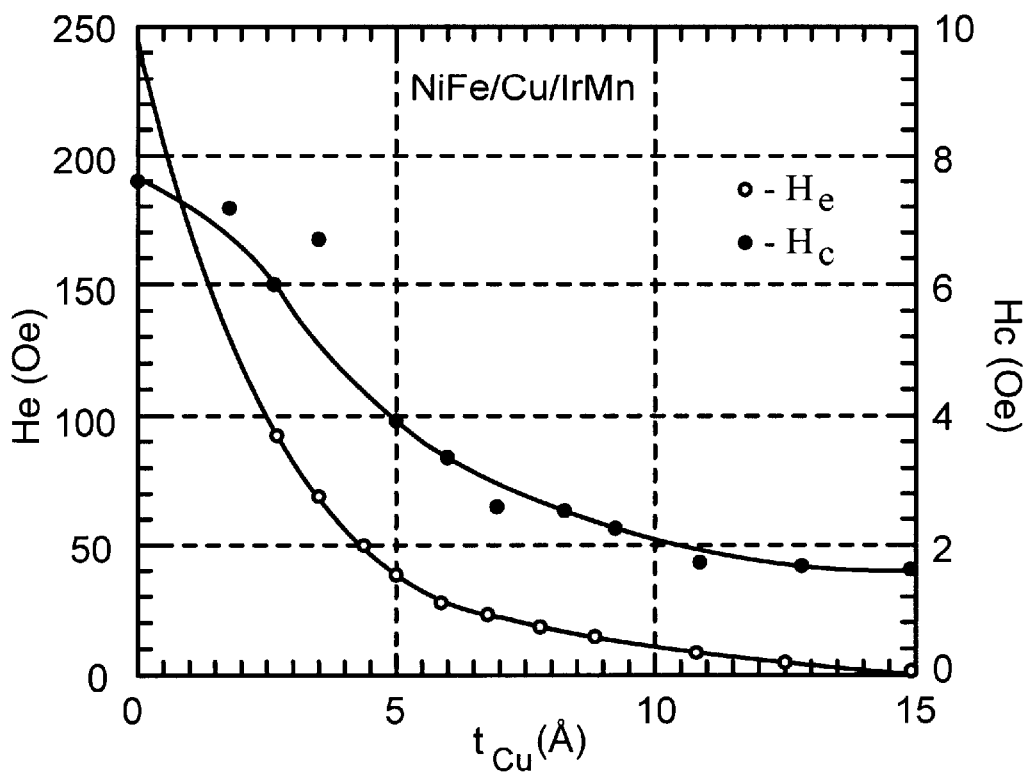
FIG. 9 is a graph illustrating the adjustment of the exchange bias field using a non-magnetic spacer layer.
Figure 10:
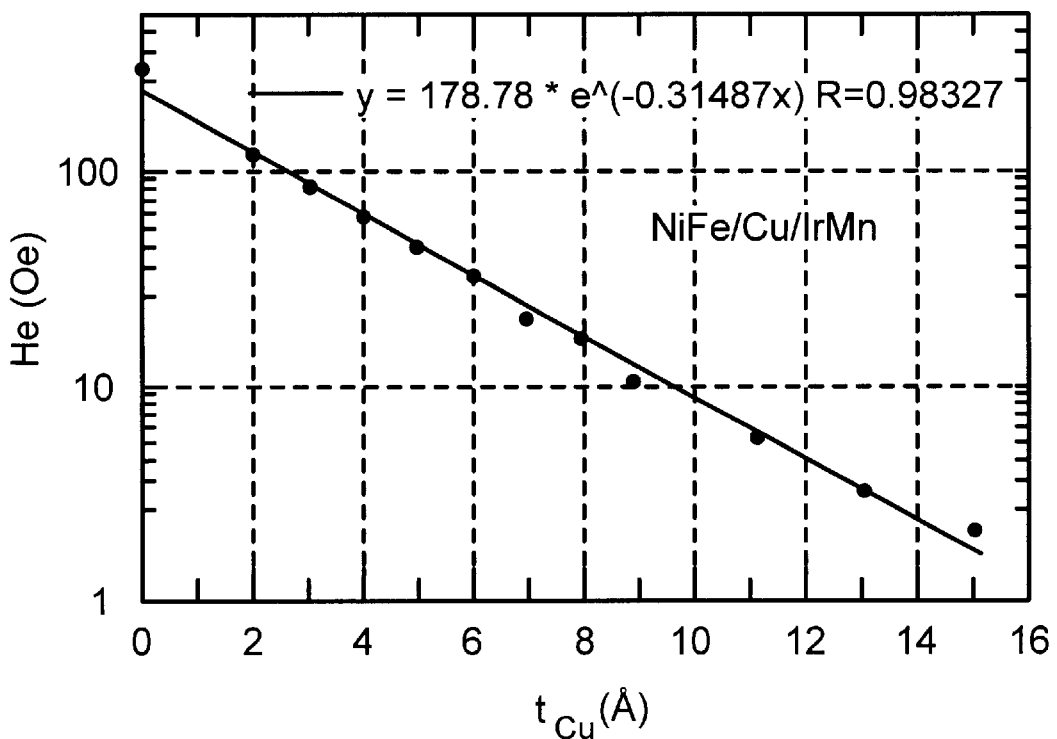
FIG. 10 is a graph illustrating the effect of non-magnetic layer thickness plotted on a logarithmic scale.

The use of a non-magnetic spacer layer between the AF layer and the free layer allows one to adjust the exchange bias field by varying the thickness of the spacer layer. For example, when using IrMn as the AF layer the spacer can be made of Cu. FIG. 9 illustrates how an exchange bias field $H_e$=245 Oe obtained when such IrMn AF layer is in direct contact with free layer of NiFe is reduced with the aid a Cu spacer ranging from 0–15 Å in thickness. Already with a Cu spacer 5 Å thick the exchange bias is reduced to less than 40 Oe with a NiFe coercivity of less than 4 Oe. In fact, as clarified in FIG. 10 where the exchange bias field $H_e$ is plotted against Cu thickness on a logarithmic scale, the dependence of the exchange coupling field on spacer layer thickness is approximately exponential. This exponential dependence allows one to precisely control exchange bias field $H_e$ without having to make the spacer layer very thick. In general, spacer layers of suitable materials ranging from 0.1 to 3.0 nm in thickness offer a sufficient $H_e$ adjustment range for balancing the sensor as dictated by equation 2. This is advantageous, since the adjustment of $H_e$ is thus accomplished without having to substantially increase the overall thickness of the sensor.

Figure 11A:
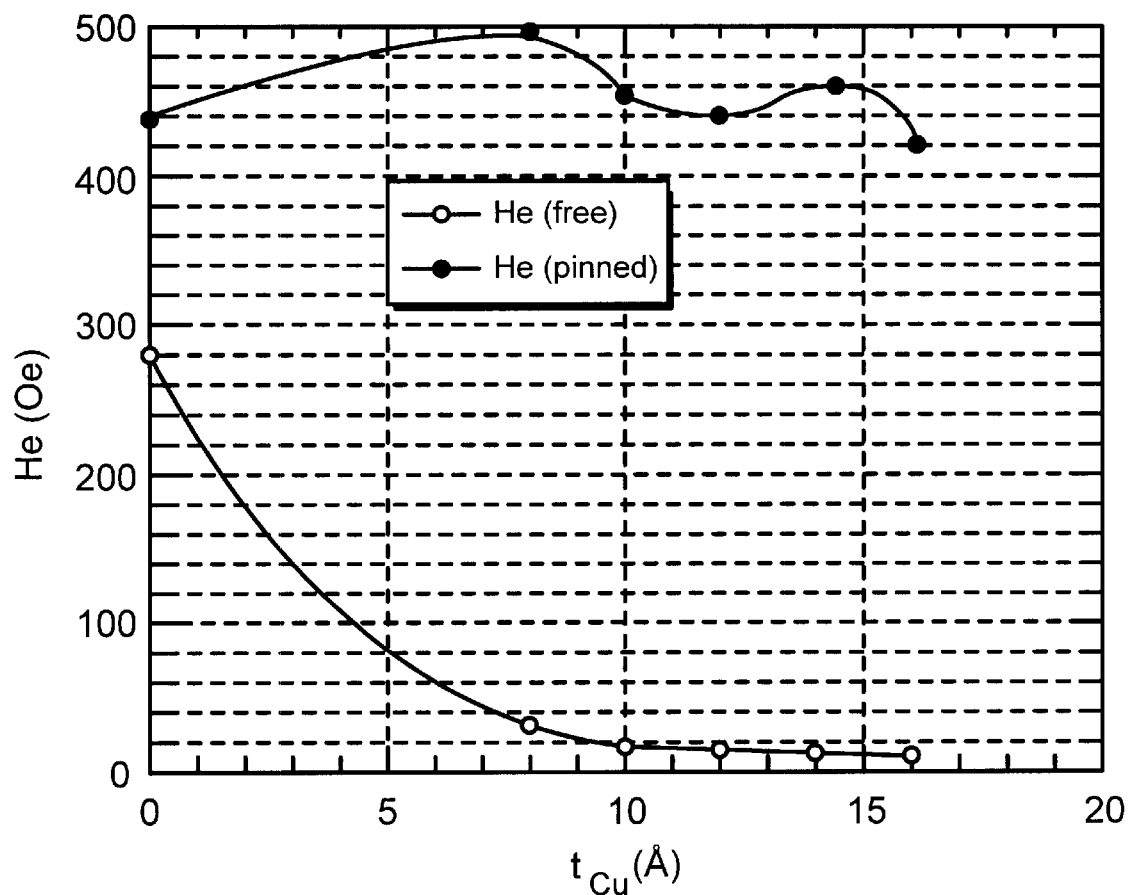
FIGS. 11A–C are graphs illustrating the magnetic properties of a practical spin valve structure of Ta(50)/Cu(20)/IrMn(80)/Cu(t)/NiFe(50)/Cu(50)/CoFe(30)/IrMn(80)/Ta(50).
Figure 11B:
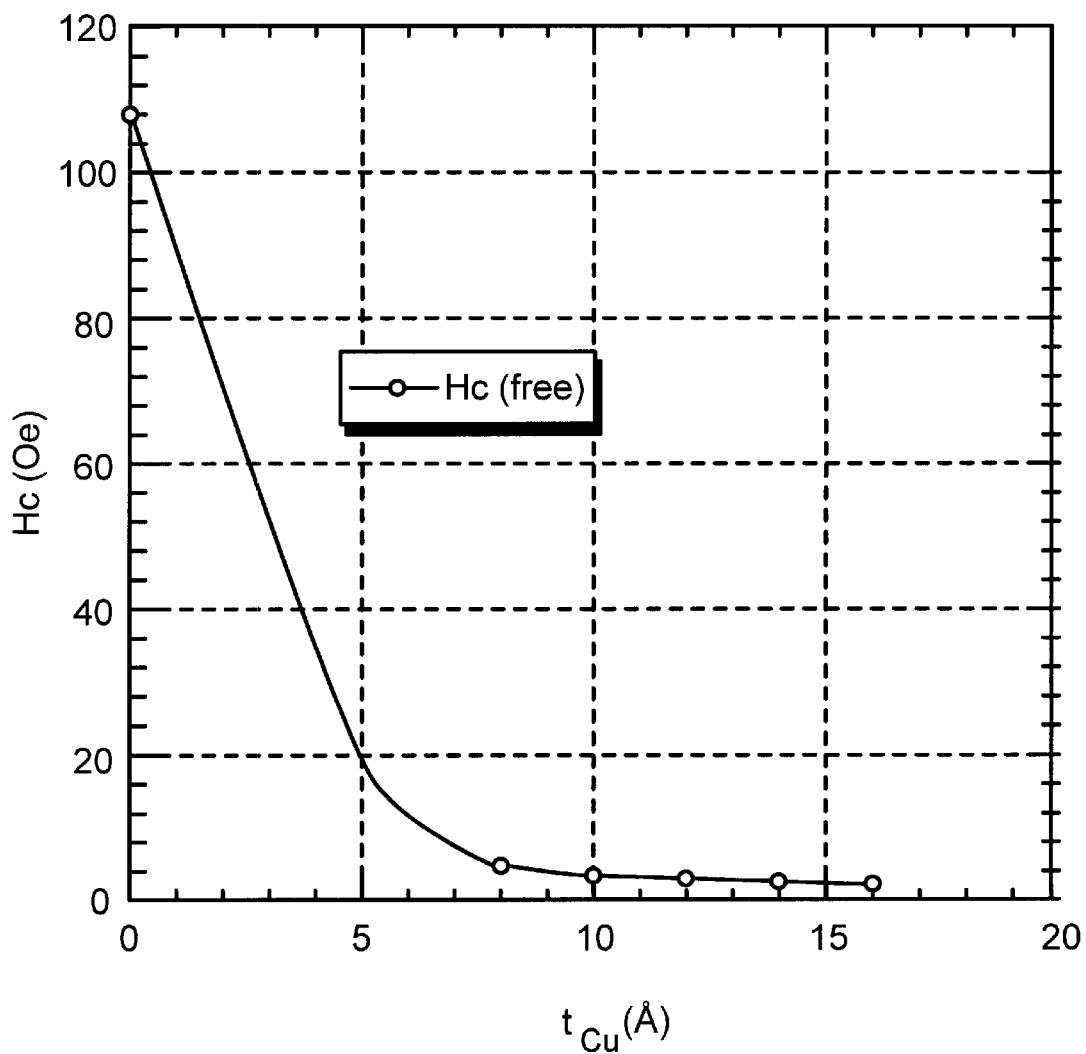
Figure 11C:
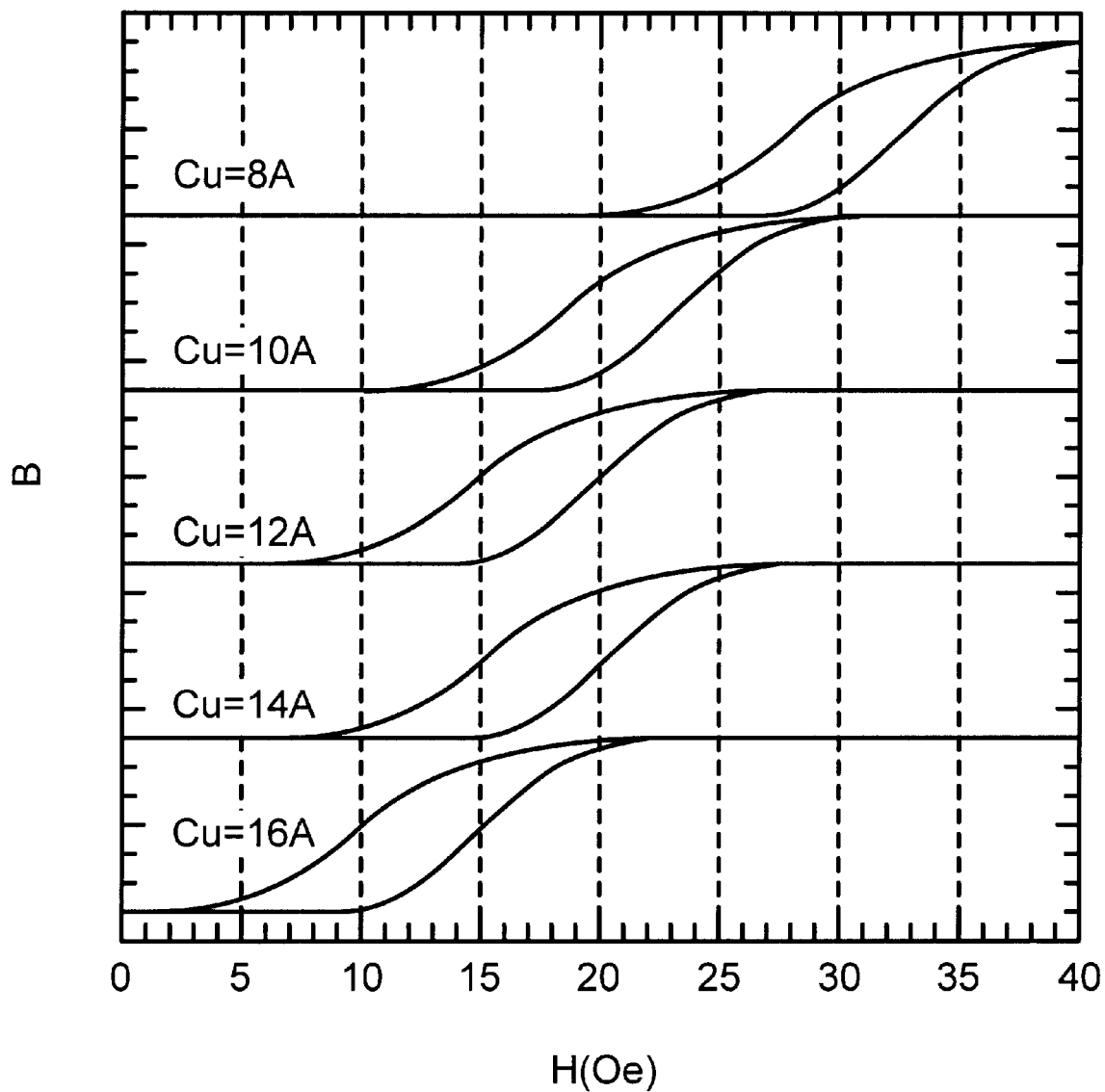

In a practical spin valve structure the addition of the AF layer exchange-coupled to the free layer brings to bear all the advantages of the invention without incurring disadvantages. In particular, it is important that the addition of AF layer which exchange-couples to the free layer does not interfere with the regular influence of the pinned layer on the free layer and any AF layer used to pin the pinned layer. FIG. 11A shows that in a complete spin valve structure Ta(50)/Cu(20)/IrMn(80)/Cu(t)/NiFe(50)/Cu(50)/CoFe(30)/IrMn(80)/Ta(50) varying the thickness t of the non-magnetic Cu spacer to allow the exchange-coupling strength to vary from a maximum to a minimum value does not significantly affect the exchange bias of the pinned layer. Furthermore, as shown in FIG. 11B, the coercivity $H_c$ of the free layer remains low (<5 Oe) when the thickness of Cu spacer exceeds about 5 Å. FIG. 11C shows the B–H loops of the free layer for the same spin valve structure at five thicknesses of Cu spacer. The B–H loops remain generally unaffected.

Figure 12:
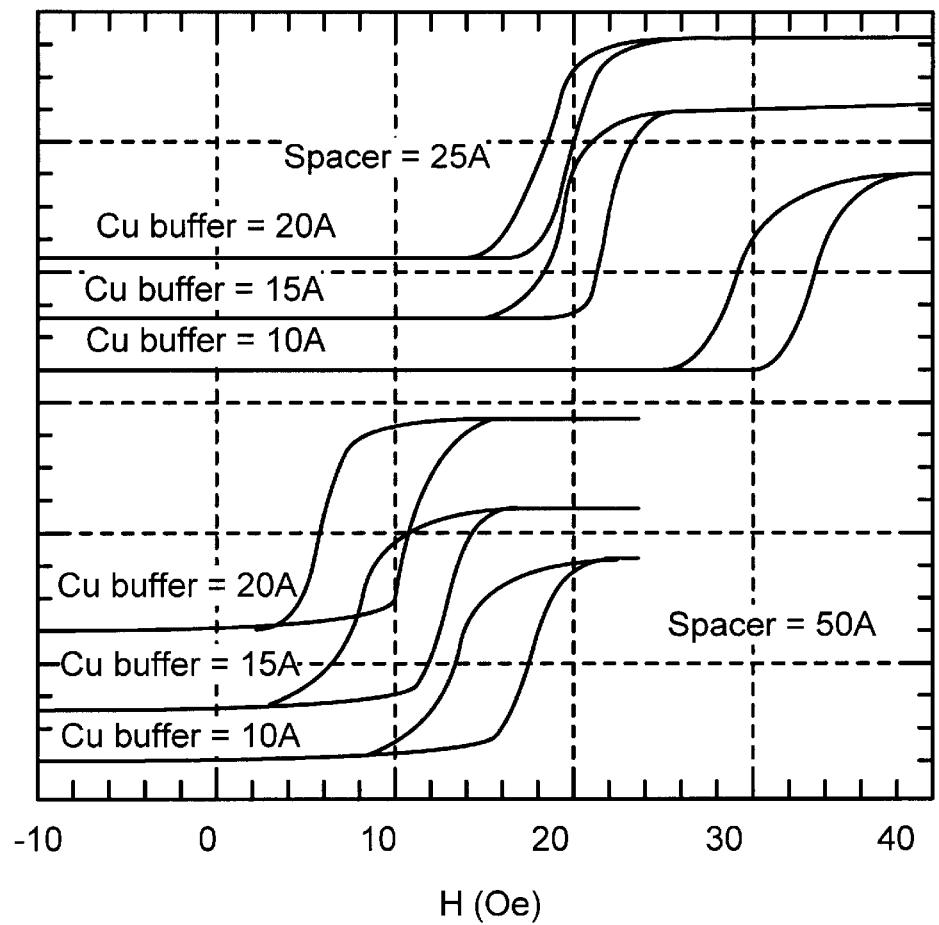
FIG. 12 are graphs of B–H loops of a free layer at two thicknesses of spacer layer between the free and pinned layers and three non-magnetic spacer (buffer) layer thicknesses.
Figure 13:
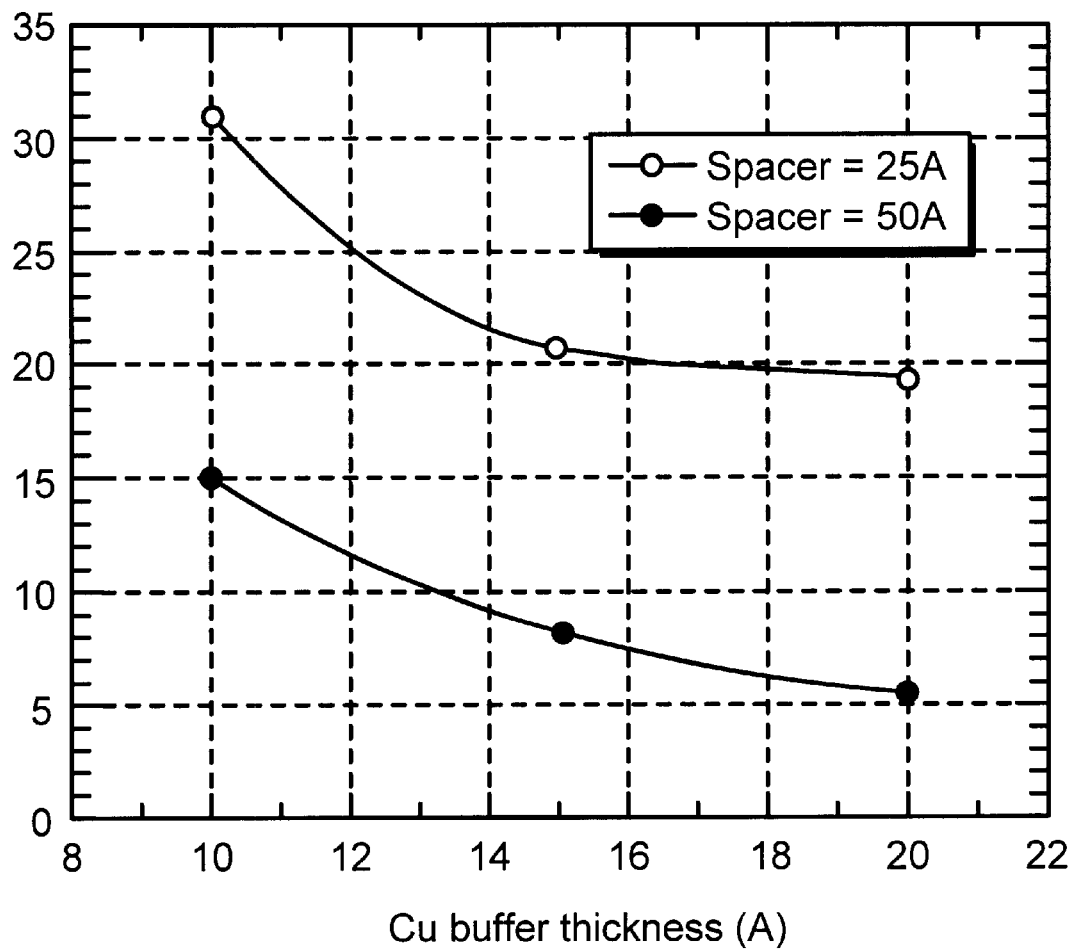
FIG. 13 are graphs of coupling field $H_i$ at the same spacer and buffer thicknesses as graphed in FIG. 12.

When a spin valve uses the same antiferromagnetic material for both the AF layer exchange-coupled to the free layer and the first AF layer for pinning the pinned layer, then it may be advantageous for exchange bias $H_e$ to have the same sign as the coupling field $H_i$ between the free and pinned layers consistent with the application of equation 2. Therefore an increase of coupling field $H_i$ (e.g., by decreasing the spacer thickness between the free and pinned layers) will have a similar effect on free layer bias as a decrease in the non-magnetic spacer thickness between the free layer and the AF layer. This is shown by B–H loops of FIG. 12 and the corresponding coupling field $H_i$ graphs of FIG. 13 for two different spacer thicknesses (25 Å and 50 Å) and three different non-magnetic spacer thicknesses (Cu), referred to as Cu buffer in the figures for clarity. For proper balancing this type of dual exchange bias of equal magnitude but in opposite directions can be achieved in several ways. For example, the spin valve can use an anti-parallel pinned structure, or it can use different AF materials with different blocking temperatures for the free and pinned layers, or else the direction of the magnetic field can be changed during the growth of the free and pinned layers.

Figure 14:
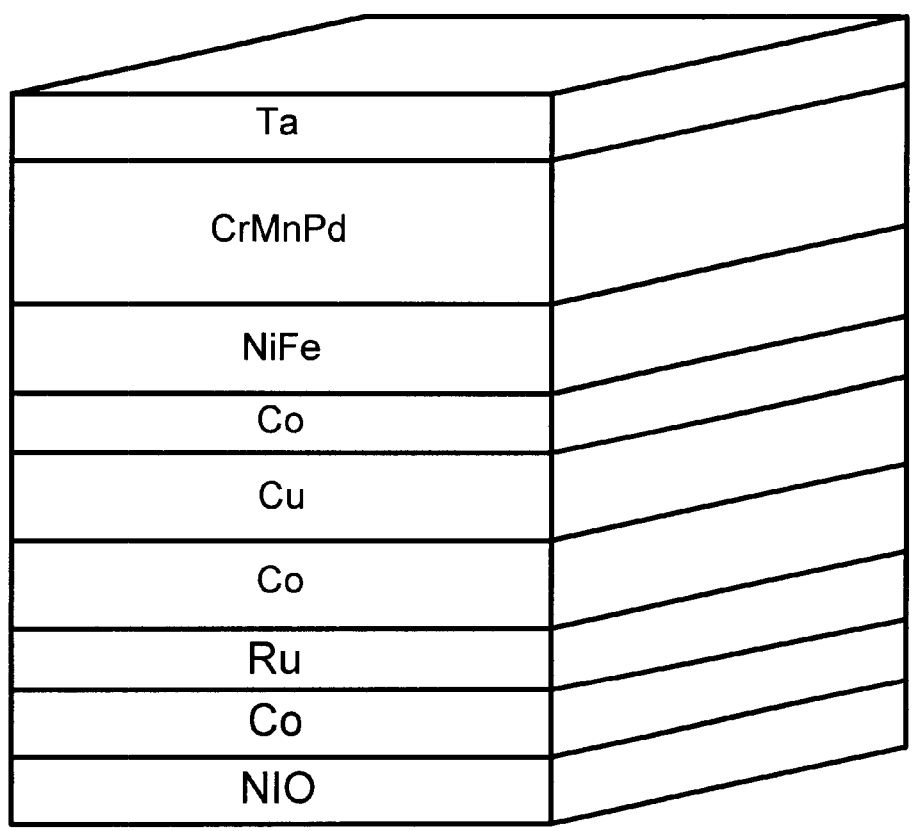
FIG. 14 is a preferred spin valve structure.

A preferred spin valve structure shown in FIG. 14, with a complete structure denoted by NiO/Co/Ru/Co/Cu/Co/NiFe/CrMnPd/Ta, consists of a ferromagnetic layer of NiO; an anti-parallel (AP) pinned trilayer including of a first ferromagnetic layer of Co, an AP spacer layer of Ru, and a second ferromagnetic layer of Co; a spacer layer of Cu; a nanolayer of Co; a ferromagnetic free layer of NiFe; an antiferromagnetic layer of CrMnPd exchange-coupled to the ferromagnetic free layer; and a capping layer of Ta. The typical field strengths in a shielded environment are $H_i$=2 Oe, $H_m$=5 Oe and $H_j$=15 Oe. With the anti-parallel pinned layer furthest from the Cu layer being the thicker of the two Co ferromagnetic layers, an exchange bias $H_e$=15+5−2=18 Oe is required for balancing.

Figure 15:
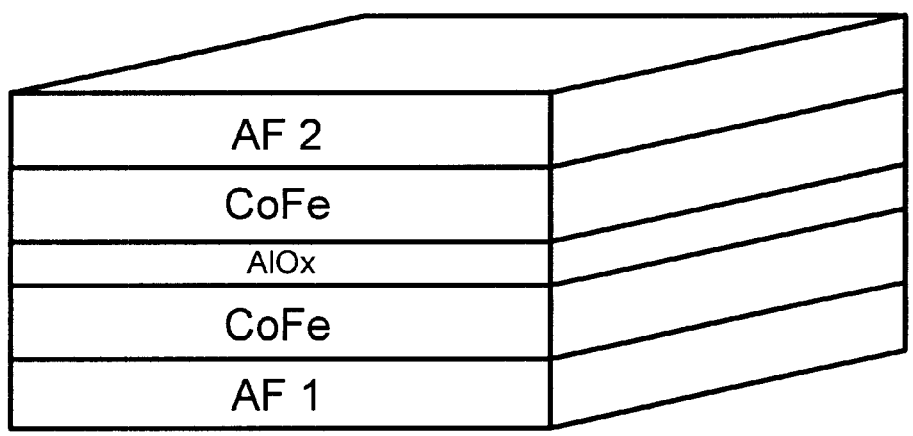
FIG. 15 is a preferred tunnel valve structure.

A preferred tunnel valve structure is shown in FIG. 15, and consists of an AF1/CoFe/AlO$_x$/CoFe/AF2 layers.

It will be clear to one skilled in the art that the above embodiment may be altered in many ways without departing from the scope of the invention. Accordingly, the scope of the invention should be determined by the following claims and their legal equivalents.

What is claimed is:

1. A magnetic read head having a multilayer magnetic sensor for detecting an external magnetic field produced by a magnetic medium, said multilayer magnetic sensor comprising:
    a) a ferromagnetic free layer having a magnetic moment responsive to said external magnetic field;
    b) a first antiferromagnetic layer magnetically exchange-coupled to said ferromagnetic free layer for producing an exchange bias field $H_e$ on said ferromagnetic free layer to bias said magnetic moment along a predetermined orientation;
    c) a ferromagnetic pinned layer in proximity to said ferromagnetic free layer; and
    d) a second antiferromagnetic layer adjacent to said ferromagnetic pinned layer for pinning said ferromagnetic pinned layer, wherein said multilayer magnetic sensor is selected from the group consisting of spin valve sensors and tunnel valve sensors.

2. The magnetic read head of claim 1, wherein said multilayer magnetic sensor further comprises a first non-magnetic spacer layer between said ferromagnetic free layer and said first antiferromagnetic layer.

3. The magnetic read head of claim 2, wherein said first non-magnetic spacer layer has a thickness in the range of 0.1 to 3.0 nanometers.

4. The magnetic read head of claim 2, wherein said first non-magnetic spacer layer comprises a material selected from the group consisting of Cu, Ag and Au.

5. The magnetic read head of claim 1, wherein said multilayer magnetic sensor is selected from the group consisting of spin valve sensors and tunnel valve sensors.

6. The magnetic read head of claim 5, wherein said multilayer magnetic sensor further comprises:
    a ferromagnetic pinned layer in proximity to said ferromagnetic free layer;

a second non-magnetic spacer layer between said ferromagnetic free layer and said ferromagnetic pinned layer; and a second antiferromagnetic layer adjacent to said ferromagnetic pinned layer for pinning said ferromagnetic pinned layer.

7. The magnetic read head of claim 1, further comprises a non-magnetic spacer layer between said ferromagnetic free layer and said ferromagnetic pinned layer, wherein said non-magnetic spacer layer comprises a high conductivity material.

8. The magnetic read head of claim 7, wherein said non-magnetic spacer layer comprises a material selected from the group consisting of Cu, Ag and Au.

9. The magnetic read head of claim 1, wherein said exchange bias field $H_e$ is chosen to substantially balance a total transverse internal magnetic field $H_t$ acting on said ferromagnetic free layer.

10. The magnetic read head of claim 9, wherein said exchange bias field $H_e$ is set by a predetermined thickness and a predetermined composition of said first antiferromagnetic layer.

11. The magnetic read head of claim 1, wherein said external magnetic field is generally transverse to said magnetic sensor and said predetermined orientation is longitudinal.

12. The magnetic read head of claim 1, wherein said first antiferromagnetic layer is in contact with said ferromagnetic free layer.

13. The magnetic read head of claim 1, wherein said pinned layer comprises an anti-parallel trilayer.

14. The magnetic read head of claim 13, wherein said anti-parallel trilayer comprises first and second ferromagnetic layers sandwiching an anti-parallel spacer layer.

15. The magnetic read head of claim 14, wherein said first and second ferromagnetic layers comprise a material selected from the group consisting of Co, Fe, Ni and their alloys and said anti-parallel spacer layer comprises Ru, Rh and Cu.

16. The magnetic read head of claim 1, wherein said first antiferromagnetic layer comprises an alloy of Mn.

17. The magnetic read head of claim 16, wherein said antiferromagnetic layer comprises an alloy selected from the group consisting of FeMn, PtMn, IrMn, PdPtMn and NiMn and said antiferromagnetic layer has a thickness between 20 and 400 Å.

18. The magnetic read head of claim 1, wherein said multilayer magnetic sensor further comprises a cobalt-alloy nanolayer adjacent to said ferromagnetic free layer.

19. The magnetic read head of claim 1, further comprises a non-magnetic spacer layer between said ferromagnetic free layer and said ferromagnetic pinned layer, wherein said non-magnetic spacer layer comprises an electrically insulating material.

20. The magnetic read head of claim 19, wherein said non-magnetic spacer layer comprises aluminum oxide.

21. The magnetic read head of claim 1, wherein said ferromagnetic pinned layer comprises a material selected from the group consisting of Co, Fe, Ni and alloys of Co, Fe, and Ni.

22. The magnetic read head of claim 1, wherein said ferromagnetic free layer comprises a material selected from the group consisting of Co, Fe, Ni and alloys of Co, Fe and Ni.

* * * * *